(12) United States Patent
Junk (10) Patent No.: US 12,264,736 B2
(45) Date of Patent: Apr. 1, 2025

(54) LUBRICANT DEVICE AND METHOD FOR SUPPLYING LUBRICANT TO A PLANET CARRIER OF A PLANETARY GEARSET (71) Applicant: ZF Friedrichshafen AG, Friedrichshafen (DE)

(72) Inventor: Alfred Junk, Passau (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 18/659,727

(22) Filed: May 9, 2024

(65) Prior Publication Data
US 2024/0376977 A1    Nov. 14, 2024

(30) Foreign Application Priority Data

May 12, 2023 (DE) ...................... 10 2023 204 450.1

(51) Int. Cl.
*F16H 57/04*    (2010.01)
*F16H 57/08*    (2006.01)

(52) U.S. Cl.
CPC ......... *F16H 57/0482* (2013.01); *F16H 57/04* (2013.01); *F16H 57/082* (2013.01)

(58) Field of Classification Search
CPC ....... F16H 57/04; F16H 57/048; F16H 57/082
USPC ....................................................... 475/159
See application file for complete search history.

(56) References Cited

U.S. PATENT DOCUMENTS

| 4,719,818 A * | 1/1988 | McCreary ............. F02B 37/105 475/159 |
| 7,695,399 B2 | 4/2010 | Sowul et al. |
| 7,909,140 B2 * | 3/2011 | Sugihara ............. F16H 57/0482 475/116 |
| 7,967,713 B2 * | 6/2011 | Haupt ................. F16C 33/6677 475/160 |

(Continued)

FOREIGN PATENT DOCUMENTS

| DE | 10 2009 028 517 A1 | 2/2011 |
| DE | 10 2019 130 825 A1 | 5/2021 |

(Continued)

OTHER PUBLICATIONS

German Patent Office, German Search Report issued in German patent application No. 10 2023 204 450.1 (Dec. 19, 2023).

*Primary Examiner* — Colby M Hansen
(74) *Attorney, Agent, or Firm* — Finch & Maloney PLLC (57) ABSTRACT A lubricant device is configured for supplying lubricant to a planetary carrier of a planetary gearset. A planetary bolt passes through and extends beyond an opening in the planetary carrier to form an axially projecting end area. A collecting tray is configured for guiding lubricant to flow along the collecting tray to the planetary bolt during use. The collecting tray has an annular intermediate element fixed to the collecting tray when assembled, and which faces axially toward the planetary carrier. The intermediate element has first and second radial projections that are spaced axially. At its projecting end area, the planetary bolt has corresponding spaced first and second fixing contours, enabling the first radial projection to be latched into the first fixing contour and the second radial projection to be latched into the second fixing contour to form an axially secure arrangement of the collecting tray and the planetary bolt.

15 Claims, 7 Drawing Sheets (56) References Cited

U.S. PATENT DOCUMENTS

| | | | | |
|---|---|---|---|---|
| 8,876,647 B2* | 11/2014 | Gallet | ................. | F16H 57/0423 |
| | | | | 184/6.12 |
| 11,268,453 B1* | 3/2022 | Desjardins | .............. | F16H 57/04 |
| 11,753,796 B1* | 9/2023 | Long | ................... | F16H 57/0486 |
| | | | | 475/159 |
| 11,767,910 B2* | 9/2023 | Brushkivskyy | ..... | F16H 57/0482 |
| | | | | 475/159 |
| 12,104,495 B2* | 10/2024 | Pap | .......................... | F02C 7/06 |
| 2015/0377343 A1* | 12/2015 | Fugel | ................ | F16H 57/0479 |
| | | | | 475/159 |
| 2016/0201791 A1* | 7/2016 | Curlier | ..................... | F02C 7/36 |
| | | | | 475/159 |

FOREIGN PATENT DOCUMENTS

| | | |
|---|---|---|
| DE | 10 2021 206 334 B3 | 9/2022 |
| DE | 10 2021 209 883 A1 | 3/2023 |
| JP | 2009108891 A | 5/2009 |
| JP | 2017180812 A | 10/2017 |

* cited by examiner

LUBRICANT DEVICE AND METHOD FOR SUPPLYING LUBRICANT TO A PLANET CARRIER OF A PLANETARY GEARSET

RELATED APPLICATIONS

This application claims the benefit of and right of priority under 35 U.S.C. § 119 to German Patent Application no. 10 2023 204 450.1, filed on 12 May 2023, the contents of which are incorporated herein by reference in its entirety.

FIELD OF THE DISCLOSURE

The invention relates to a lubricant device for supplying lubricant to a planetary carrier of a planetary gearset, comprising at least one planetary bolt which is passed through and projects beyond an opening of the planetary carrier so that at the front end an axially projecting end area is formed, and further comprising an annular collecting tray for guiding lubricant flowing onto and along the collecting tray during operation to the at least one planetary bolt. In addition, the invention relates to a method.

SUMMARY

Planetary gearsets are known in many contexts. To lubricate and cool the planetary gearwheels of the individual gearsets provision is generally made to produce in the planetary bolts of the planetary gearwheels in each case lubricant bores, usually a central bore and one or more radial bores, so that by way of these lubricant bores, lubricant can be supplied both to the bearings and to the teeth of the planetary gearwheels concerned.

For that purpose, the lubricant is usually conveyed through a central shaft of the planetary gearset and through suitably formed radial bores of the central shaft to an area close to the individual planetary gearsets, preferably an area immediately adjacent to the planetary gearset in question, in such manner that by virtue of the action of centrifugal force, the lubricant can flow past the respective planetary gearset in the radial direction.

To retain this radially flowing or spraying lubricant in the area of the bolts of the planetary gearset concerned, collecting trays are usually provided, which are preferably fixed to the planetary carrier of the planetary gearset concerned.

As a result of centrifugal force, the lubricant so collected passes in a simple manner into the lubricant bores of the bolts of the planetary gearset and from there to the bearings and teeth of the planetary gearwheels.

DE 10 2021 209 883 A1 relates to a lubricant device for fixing to a planetary carrier of a planetary gearset, which comprises an all-round guiding section which is provided for the purpose, when the lubricant guiding device is attached to the planetary carrier, of guiding lubricant that is flowing radially from the inside onto the guiding section in the direction toward the planetary carrier, wherein an all-round web adjoins the guiding section and extends axially on one side relative to the guiding section, by means of which the lubricant guiding device is attached to the planetary carrier. In this case, at a circumference the web forms a contact surface for contacting the planetary carrier, and at least at one transition of the axially projecting web into the guiding section stiffening ribs are provided, distributed around the circumference.

DE 10 2019 130 825 A1 discloses an oil catcher ring for a planetary transmission, with a disk-shaped annular body in which a plurality of sections for collecting and guiding the oil into oil supply bores are formed in bearing bolts of the planetary transmission which are arranged on a planetary carrier and which carry planetary gearwheels, wherein the sections are in the form of several features raised on one side of the annular body, open toward the inner circumference of the annular body and tapering funnel-like toward the outer circumference, such that on the side of the annular body opposite to the features a projecting all-round edge section is associated with each feature, which in the assembled condition is in contact with the planetary carrier, to which the oil catcher ring is fixed.

SUMMARY

Starting from the above prior art, the purpose of the present invention is to provide an improved and simple-to-assemble lubricant device, and also a method.

This objective is achieved by a lubricant device as variously disclosed herein. The present disclosure is also directed to a method for assembling a lubricant device.

Advantageous further developments and design features of the invention are indicated in the subordinate claims.

The objective is achieved by a lubricant device for supplying lubricant to a planetary carrier of a planetary gearset, which comprises at least one planetary bolt that passes through and extends beyond an opening of the planetary carrier so that at the front end an axially projecting and area is formed, further comprising an in particular annular collecting tray for guiding lubricant that flows along the collecting tray during operation to the planetary bolts, wherein the collecting tray comprises an annular intermediate element which, in the assembled condition, is fixed on the collecting tray facing axially in the direction toward the planetary carrier, wherein the intermediate element has a radial first projection and a separate radial second projection a distance away in the axial direction, and wherein the planetary bolts, at their axially projecting end areas, have a corresponding first fixing contour and a second fixing contour a distance away in the axial direction, so enabling the first radial projection of the annular intermediate element to be latched into the first fixing contour in order to produce an rotationally secure arrangement and the second radial projection to be latched into the second fixing contour in order to form an axially secure arrangement of the collecting tray and also the planetary bolts.

In this case, for example, the intermediate element is a ring which, in particular, has a smaller radius than the essentially circular-shaped collecting tray. This means that the collecting tray extends radially beyond the annular intermediate element.

The radial direction is perpendicular to the axial direction.

The first and second fixing contours are axially separated, in such manner that the first and the second projection can be latched into them at the same time, and therefore in particular the first and second fixing contours are the same distance apart as are the first and second projections.

In this context a projection is essentially a section or a section element that projects in the radial direction.

Planetary bolts (planetary gearwheel bolts, bearing bolts) serve to hold and mount the planetary gearwheels (planetary wheels).

Thanks to the invention, the collecting tray can be fitted easily by latching the two projections into the corresponding fixing contours of the planetary bolts.

Thanks to the arrangement of the two projections in the corresponding fixing contours, the planetary bolts are secured and at the same time the planetary bolts prevent the rotation or loss of the collecting tray (dual function).

Thus, by virtue of the lubricant device according to the invention, integrated security against loss and against rotation is realized for the planetary bolts and the collecting tray.

Thanks to the lubricant device according to the invention, costs can be avoided by omitting an otherwise necessary thread in the planetary carrier and in the collecting tray, as well as corresponding fixing pins. Furthermore, the costs for fitting the threads together or providing bores for receiving the fixing pins can be avoided. In any case, such fixing pins can absorb axial and radial forces only to some extent; in addition, they can result in expansion at the threads and thus to loosening of the connection.

By virtue of the lubricant device according to the invention, fixing pins, including their fitting, and also the costs for producing bores that receive the fixing pins, can be dispensed with.

By virtue of the lubricant device according to the invention, the planetary bolts and also the collecting tray are secured against loss and rotation, and this occurs even with large centrifugal forces and at high temperatures. Thus, in contrast to the prior art, the effect of large centrifugal forces is to press or push the two radial projections against the fixing contours, so reinforcing the security against loss and rotation.

Since the planetary bolts of the prior art are additionally secured against rotation and loss by means of spring pins, thanks to the lubricant device according to the invention the costs of assembly, bores and the spring pins themselves can also be avoided.

By virtue of the lubricant device according to the invention, compared with the prior art, the planetary bolts and the collecting tray are secured against rotation or loss in both directions.

Furthermore, thanks to the lubricant device according to the invention, there is no need for stiffening ribs on the collecting tray, which would result in greater splash losses.

In a further design, the first fixing contour is in the form of a flat step at an extreme axial end of the axial end area of the planetary bolt and the first radial projection has a flat contact surface corresponding thereto. The contact of the flat contact surface against the flat step provides security against rotation.

Thanks to the axial arrangement such a step can be produced simply in every planetary bolt.

Owing to centrifugal force, the flat contact surface is pressed against the flat step, and this increases the security against rotation and loss.

In a further design, the first radial projection is trapezium-shaped or rectangular, with the flat contact step surface corresponding thereto forming the first fixing contour. In that way the first projection can be produced easily. Likewise, the flat contact surface can in each case be beveled, in particular laterally through a chamfer, for example, given a curvature or bend, so that assembly is effected by rotating the collecting tray to bring about the simplified latching of the flat contact surface into the first fixing contour in its form as a flat step. In that way assembly is facilitated.

In a further design, the second fixing contour is in the form of a groove. In particular the groove can be an all-round groove.

Furthermore, at its end the second projection is made uniformly convex with a curvature such that the curvature corresponds essentially to an existing planetary bolt curvature of the planetary bolts. This ensures a secure contact of the second projection in the groove to ensure the axial securing of the planetary bolt and also the collecting tray. Centrifugal forces also reinforce the security against rotation, since they push the second projection more firmly into the groove. Here, "convex" means that there is a bend or curvature in the direction toward the middle of the intermediate element.

Furthermore, the second radial projection can also in each case be beveled laterally through a chamfer, so that the assembly is carried out by rotating the collecting tray to bring about the simple latching of the convex-shaped second projection in the second fixing contour in the form of a groove. In that way, by rotating the annular intermediate element the two projections can latch respectively into the groove and the flat step, and thereby ensure security against loss or rotation.

In a further design, the first radial projection and the second radial projection are arranged one behind the other an axial distance apart. Analogously, the first fixing contour, i.e., the step, and the second fixing contour, i.e., the groove, are arranged one behind the other.

In a further design, a plurality of planetary bolts are arranged in a circle, in particular at equal distances apart, such that each planetary bolt, analogously to its axially projecting end, has a corresponding first fixing contour and a second fixing contour axially a distance away from the latter, wherein, arranged correspondingly, the intermediate element has in each case a radial first projection and a separate radial second projection an axial distance away, for latching the respective first radial projection of the annular intermediate element into the respective first fixing contour in order to form an arrangement secure against rotation and for latching the respective second radial projection into the respective second fixing contour in order to form an axially secure arrangement of the collecting tray and also the planetary bolts.

Here, the second radial projection can be in the form of an all-round circular surface in which, on the one hand, a convex curvature is formed for making contact with the groove of the planetary bolts and which has a plurality of apertures which allows the collecting tray to be pushed axially in between the planetary bolts and the intermediate element to be arranged in such manner that such rotating of the collecting tray, and thus also the intermediate element, enables the projections to latch into fixing contours such as the groove and the flat step. In that way inexpensive assembly by the axial pushing in and subsequent rotation and the consequent latching-in is made possible. By virtue of so simple a latching mechanism all the planetary bolts and the collecting tray as well can be secured all at once.

In a further design the collecting tray has at least one overflow aperture for limiting the amount of lubricant in the collecting tray. In that case, the at least one overflow aperture is preferably arranged radially under a blind hole made in the planetary bolt in the collecting tray.

An overflow aperture, which in particular can be in the form of an overflow bore, limits the lubricant level, specifically the oil level in the collecting tray, the result of this being to limit the lubricant stored in the collecting tray. Owing to the limited quantity of lubricant in the collecting tray, the centrifugal load is thereby also limited. Instead of an overflow bore, some other element which limits the oil level in the collecting tray, such as a groove, can be provided.

In particular, an overflow bore or groove can be made in each planetary bolt.

In a further design, the collecting tray is in the form of a circular surface and radially on the inside, in particular around the inner circumference, blades are arranged on the collecting tray in order to produce a suction force that acts upon the lubricant.

In this context the radial inside is that side of the collecting tray which faces toward the middle.

In that way the collecting tray can be made essentially as a circular surface, depending on the form of the planetary gearset and the arrangement of the planetary gearwheels.

In a further feature the blades are arranged circumferentially, equidistantly around the collecting tray.

Furthermore, in another design feature the location and angular position of the blades are adjusted to match the planetary gearset, to influence the suction effect and the direction of the airflow. In particular, at higher rotation speeds a suction effect can be produced, and in that way, for example, oil can be drawn into the inner area of the collecting tray in a controlled manner. Oil droplets are drawn in and impact against the wall of the planetary carrier, from where, due to centrifugal force, they flow outward to the planetary bolts and into the blind holes to be transferred to the gearwheels. Thanks to the suction effect more oil is drawn in, and for that reason the collecting tray can be made narrower overall.

By virtue of the location and angular position of the blades, the suction effect and the direction of the airflow can be influenced.

In particular the two projections can be made of metal, for example steel, and fixed onto the intermediate element. This is advantageous for the securing of the planetary bolts. Alternatively, the collecting tray and the intermediate ring with the projections can be made integrally of one material, for example plastic.

Furthermore, the objective can be achieved by a method for assembling a lubricant device for supplying lubricant to a planetary carrier of a planetary gearset, the method comprising the following steps:

preparation of at least one planetary bolt, which is passed through and extends beyond an opening in the planetary carrier, so that at the front end an axially projecting end area is formed, and wherein, at its axially projecting end area, the planetary bolt has a first fixing contour and a second fixing contour axially a distance away from the first one, preparation of an in particular annular collecting tray for guiding lubricant that flows along the collecting tray during operation to the planetary bolts, wherein the collecting tray has an annular intermediate element which is arranged axially on the collecting tray facing in the direction toward the planetary carrier, the intermediate element having a first radially extending projection and a separate, second radial projection a distance away from the first one in the axial direction, arrangement of the collecting tray so that the first radial projection of the annular intermediate element latches into the first fixing contour in order to form an arrangement secure against rotation and so that the second radial projection latches into the second fixing contour in order to form an axially secure arrangement of the collecting tray and also of the planetary bolts.

The method can be extended to a plurality of planetary bolts, so that these, for example by means of an intermediate element, in this case the intermediate ring, can all be secured at the same time, and also the collecting tray can be secured to the plurality of planetary bolts at the same time.

Moreover, the advantages of the lubricant device according to the invention can be extended to the method.

BRIEF DESCRIPTION OF THE DRAWINGS

Further features and advantages of the present invention emerge from the following description, which refers to the attached figures which show, in a schematic manner.

DETAILED DESCRIPTION

Figure 1:
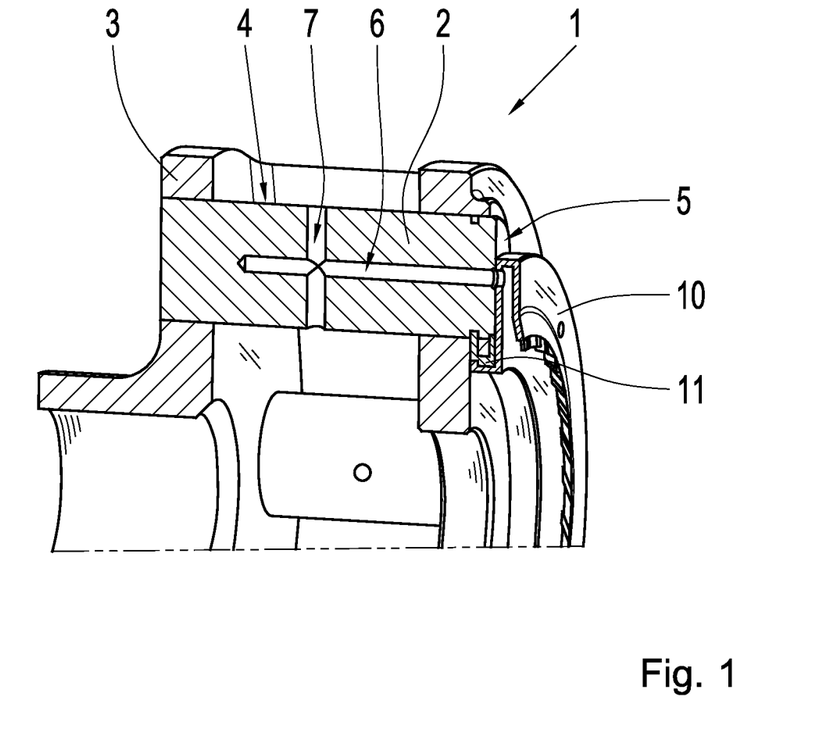
FIG. 1: A lubricant device according to the invention.

FIG. 1 shows a lubricant device 1 for supplying lubricant to a planetary carrier 3 of a planetary gearset.

This comprises a planetary bolt 2, which passes through and extends beyond an opening 4 in the planetary carrier 3, so that at the front end an axially projecting end area 5 is formed.

The planetary bolt 2 has a blind-hole bore 6 for supplying oil as a lubricant by the action of centrifugal force. As the result of centrifugal force, the oil supplied makes its way in a simple manner through ducts 7 connected to the blind-hole bore 6, to the bearings and teeth of the planetary gearwheels.

Figure 2:
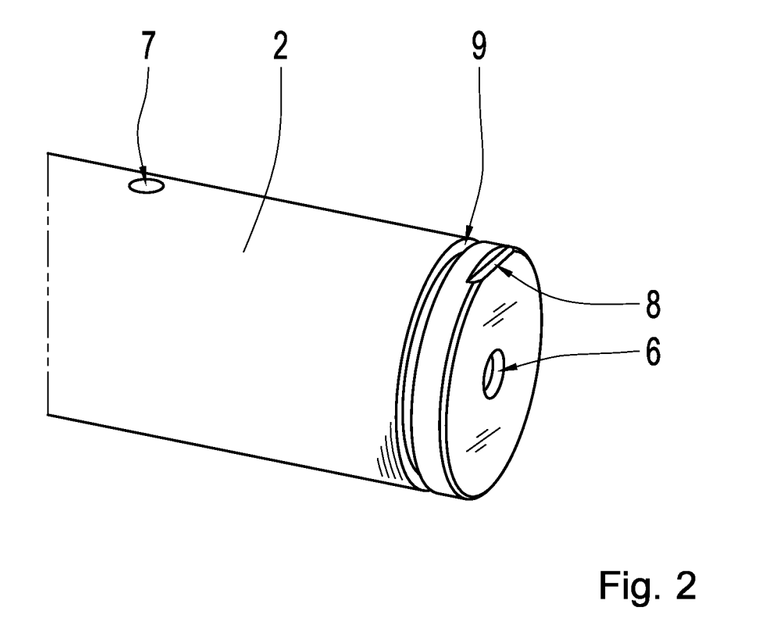
FIG. 2: A planetary bolt with a first fixing contour and a second fixing contour.
Figure 3:
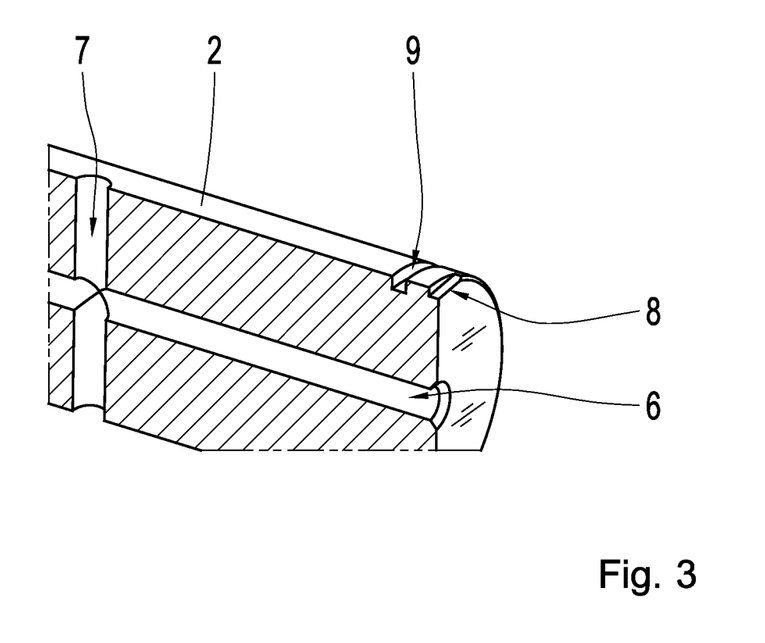
FIG. 3: A cross-section through the planetary bolt.

In this case the axially projecting end area 5 has two fixing contours. In FIGS. 2 and 3 the planetary bolt 2 and the two fixing contours are shown in detail.

The first fixing contour is formed at the outermost axial end of the axial end area 5 of the planetary bolt 2 as a flat step 8 (step surface/recess).

This can be produced simply, for example by milling or cutting. An axial distance away, the second fixing contour is made in the form of a groove 9. The groove 9 can be an all-round groove.

FIG. 3 shows a cross-section through the planetary bolt 2 and the groove 9, and also the flat step 8.

In addition, the figure shows the blind-hole bore 6 and the duct 7 connected thereto, through which the oil is guided to the gearwheels and teeth of the planetary gearset.

Furthermore, the lubricant device comprises a collecting tray 10.

Figure 4:
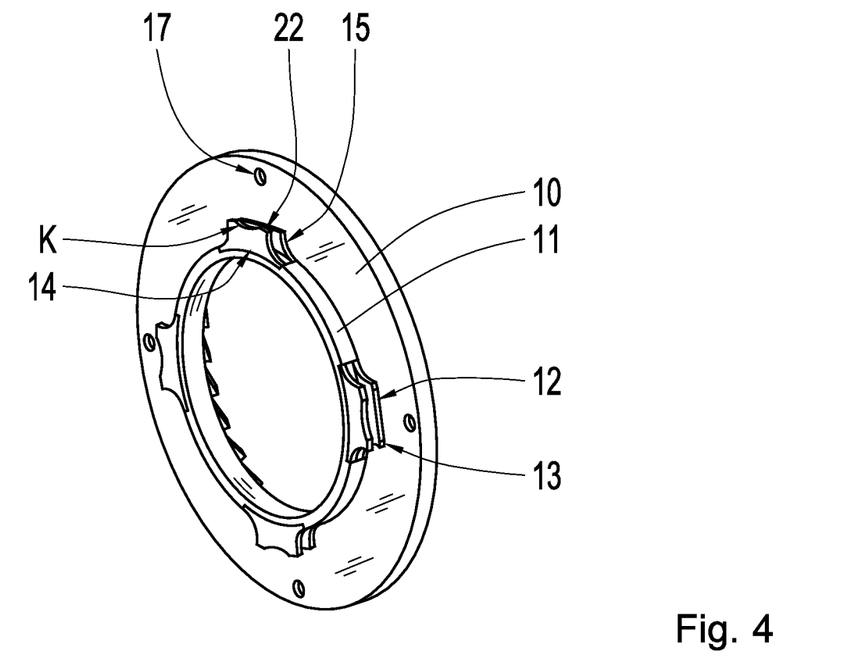
FIG. 4: An annular collecting tray.

FIG. 4 shows an annular collecting tray 10 of the lubricant device according to the invention, in detail. On the collecting tray 10, facing axially toward the planetary carrier 3, there is arranged an intermediate ring 11 which is radially smaller than the collecting tray 10. On the intermediate ring 11, corresponding to the number of planetary bolts 2 arranged in a circle, there is in each case a first projection 15 and a second projection 14 arranged axially one behind the other. The axial separation corresponds approximately to the distance with which the groove 9 and the flat surface 8 face one another.

In this context radial means that the projections 14, 15 extend in the radial direction. The first radial projection 15 has a flat contact surface 12 that corresponds to the flat step 8 on the planetary bolt 2, so that contact between the flat contact surface 12 and the flat step 8 is possible. The first radial projection 15 can be trapezium-shaped or rectangular, with the corresponding flat contact surface 12.

Furthermore, in each case the flat contact surface 12 is beveled at the side with a chamfer 13, so that assembly by rotating the collecting tray 10 for the simple latching of the flat contact surface 12 into the first fixing contour in its form of the flat step 8 can be carried out.

By virtue of the flat contact surface 12 of the first projection 15, which after assembly is latched into or pressed against the flat step 8, the planetary bolt 2 and also the collecting tray 10 are secured against rotation, i.e., a dual function is realized.

Moreover, the second radial projection 14 can also be trapezium-shaped or rectangular, wherein at its radial end the second projection 14 is made uniformly convex with a curvature K such that the curvature K corresponds essentially to an existing curvature of the planetary bolt 2. This enables a firm contact of the second projection 14 against the groove 9.

The second radial projection 14 can also have a lateral bevel 22 so that assembly is carried out by rotating the collecting tray 10 for the simple latching of the convexly shaped second projection 14 into the second fixing contour in the form of a groove 9.

By virtue of the latching of the second radial projection 14 in the groove 9, the planetary bolt 2 and also the collecting tray 10 are secured axially.

Figure 5:
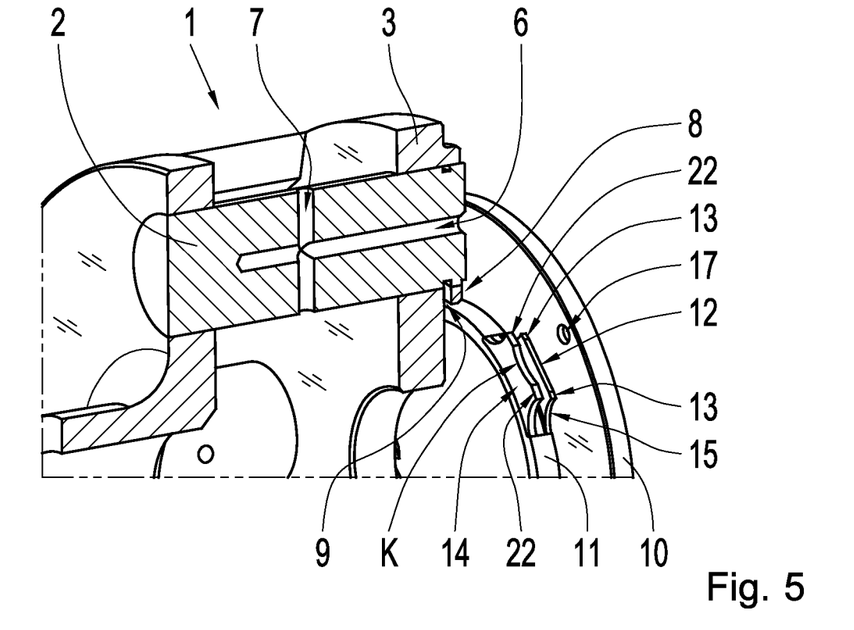
FIG. 5: The assembly of the collecting tray.

FIG. 5 shows the assembly of the collecting tray 10 on a plurality of planetary bolts 2 arranged in a ring. The radius of the intermediate ring 11 is chosen such that the respective projections 14, 15 of the intermediate ring 11 can be latched or pressed into the respective grooves 9 and flat steps 8 of the planetary bolts 2.

For this, the intermediate ring 2 is first pushed over the axially projecting end area 5 of the planetary bolts 2 and arranged in such manner as to enable latching to take place by rotating the collecting tray 10.

Figure 6:
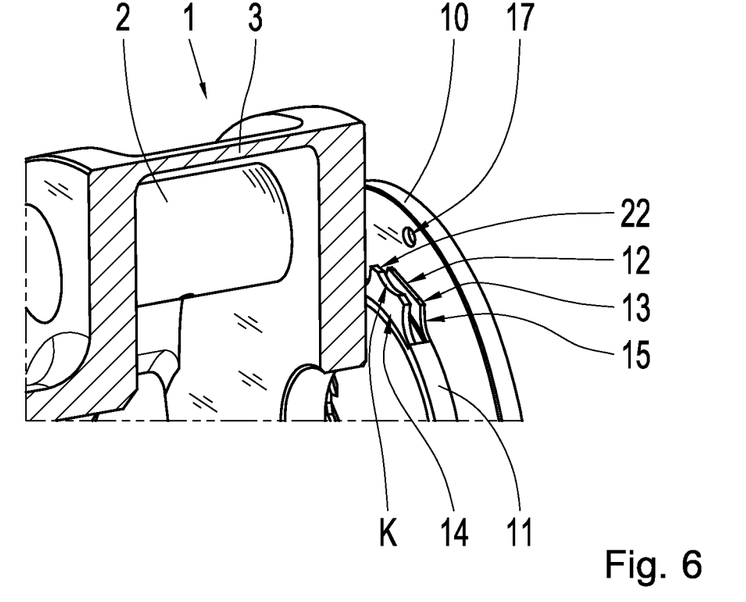
FIG. 6: A rotation of the collecting tray and the intermediate ring.

FIG. 6 shows the rotation of the collecting tray 10 and the intermediate ring 11 in order to latch the two projections 14, 15 in the axially projecting end area 5 of the planetary bolts 2.

Figure 7:
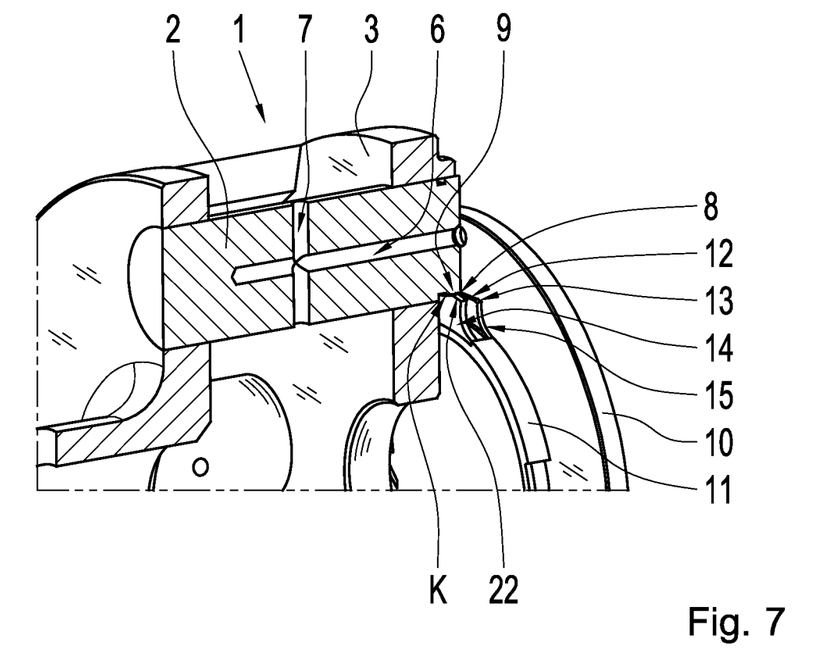
FIG. 7: An assembled collecting tray with its intermediate ring.

FIG. 7 shows an assembled collecting tray 10 with its intermediate ring 11.

Thanks to the lubricant device according to the invention, the planetary bolts 2 and also the collecting tray 10, in the form of the collecting tray 10 with its intermediate ring 11, are secured against rotation and loss. Furthermore, inexpensive assembly is enabled by a simple latching mechanism, i.e., by pushing the intermediate ring 11 axially between the planetary bolts 2 and then rotating it, for example through 45°. Thanks to the lubricant device 1 according to the invention, all the planetary bolts 2 can be secured at the same time.

Thanks to the lubricant device 1 according to the invention, the collecting tray 10 and the planetary bolts 2 are secured against loss and rotation, and this even with large centrifugal forces and at high temperatures. Thus, in contrast to the prior art the effect of large centrifugal forces is to harder press or push the two radial projections 14, 15 against the groove 9 and flat step 8 respectively, whereby the security against loss and rotation is increased.

Accordingly, the costs of producing a necessary thread in the planetary carrier 3 and in the collecting tray 10, and also producing corresponding fixing pins, can be avoided. Moreover, the costs for fitting the threads together and of producing bores to receive the fixing pins can also be avoided.

Thanks to the lubricant device 1 according to the invention fixing pins, including the assembly of the fixing pins and the assembly costs for making bores to receive the fixing pins can be dispensed with.

By virtue of a lubricant device 1 designed in this manner, the planetary bolts 2 are all (at the same time) secured and furthermore the planetary bolts 2 ensure that the collecting tray 10 is secured against rotation and loss (dual function).

Figure 8:
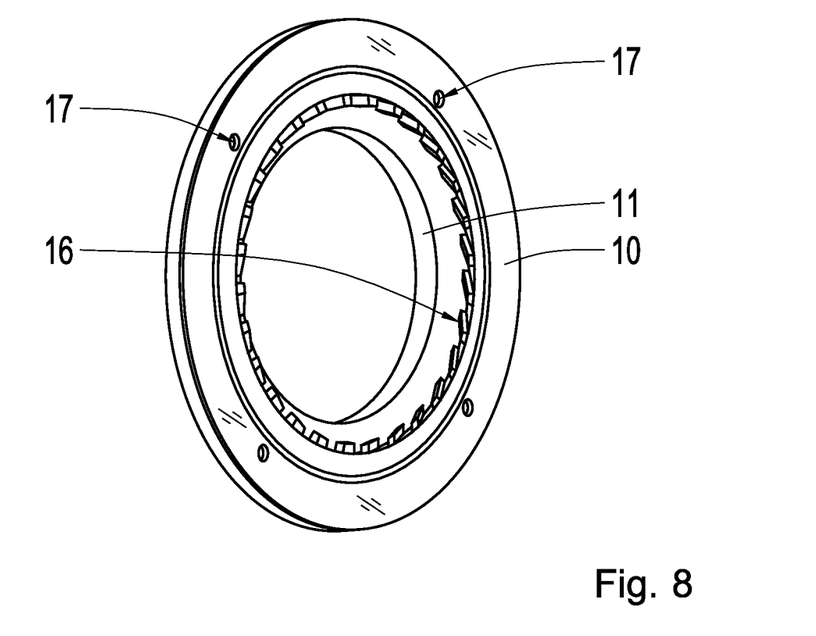
FIG. 8: A collecting tray, seen from the front.

FIG. 8 shows a collecting tray 10 viewed from the front. This has blades 16 arranged radially on the inside, to produce a suction force that acts upon the oil. In that way the oil can be captured in the collecting tray 10 in a controlled manner, in contrast to the prior art in which the oil makes its way randomly to the inside of the collecting tray.

In this case the blades 16 are arranged equidistantly around the inside circumference of the collecting tray 10. Thanks to the blades 16, and particularly at high rotation speeds, a suction effect is produced so that oil is drawn into the inside area of the collecting tray 10 in a controlled manner. Oil droplets are drawn in, impact upon the walls of the planetary carrier 3, and from there flow into the blind-hole bores 6 under the action of centrifugal force.

Owing to the suction effect more oil is drawn in, so that the collecting tray 10 as a whole can be made narrower. By means of the location and angular position of the blades 16 the suction effect and the direction of the airflow can be influenced.

The location and angular position of the blades 16 can be adjusted to match the planetary gearset and to influence the suction effect and the direction of the airflow.

Figure 9:
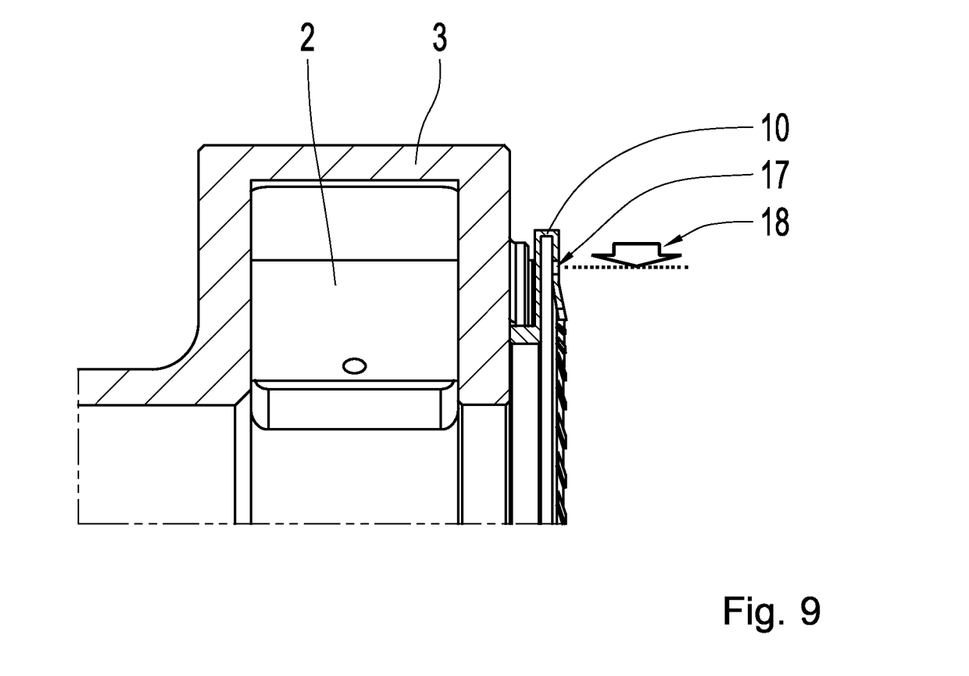
FIG. 9: An overflow bore.

Moreover, the collecting tray 10 can have an overflow bore 17 for limiting the amount of oil in the collecting tray 10.

FIG. 9 shows such an overflow bore 17.

Here, the overflow bore 17 is arranged radially below the blind-hole bore 6 made in the planetary bolt 2 in the collecting tray 10.

Thanks to the overflow bore 17 the oil level in the collecting tray 10 is limited (arrow 18), resulting in the limitation of the oil stored in the collecting tray. Owing to the limited amount of oil in the collecting tray 10 the centrifugal force loading is also limited.

Figure 10:
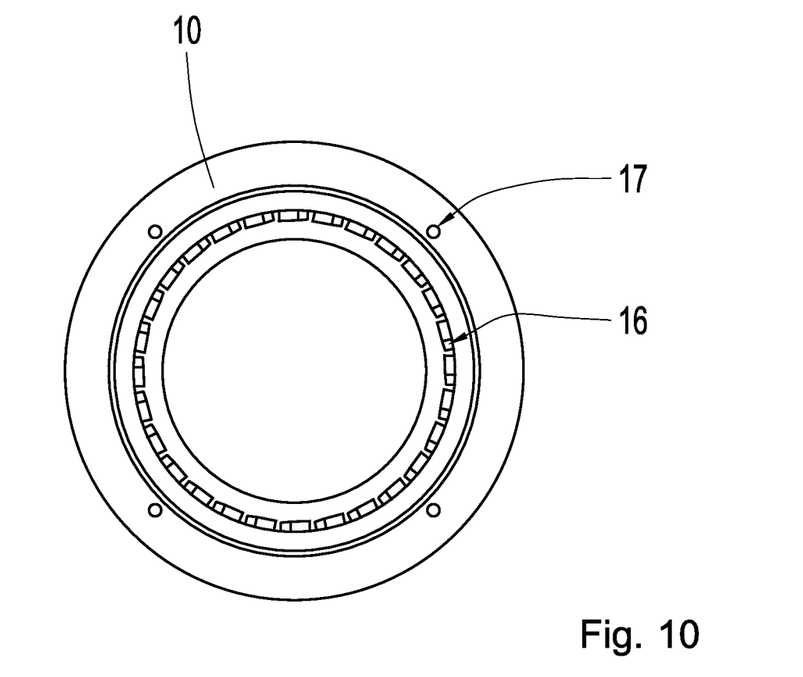
FIG. 10: Several overflow bores.

In particular several overflow bores 17, for example one for each planetary bolt 2, can be made.

FIG. 10 shows such overflow bores 17.

These can be arranged equidistantly around the whole of the collecting tray 10.

Figure 11:
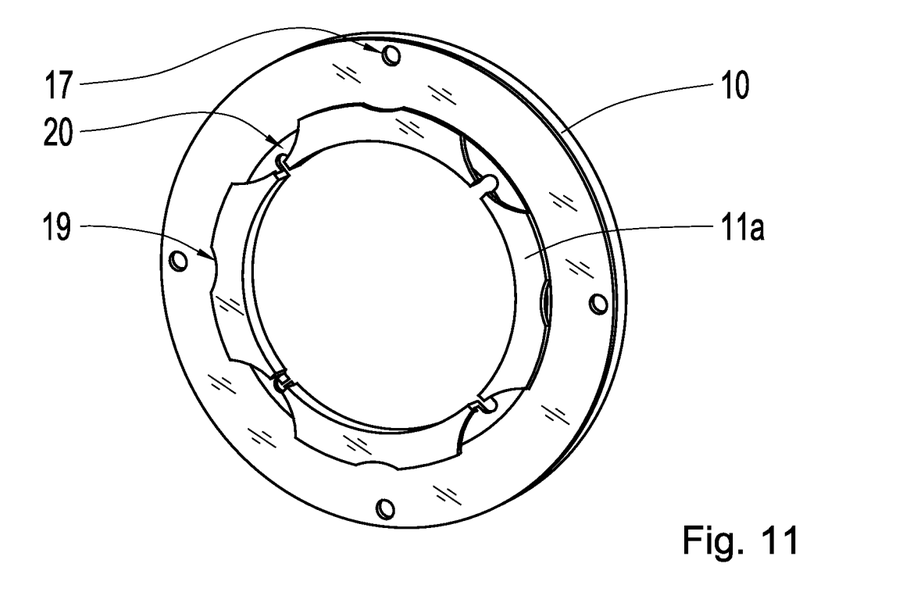
FIG. 11: A further design of an intermediate ring.

FIG. 11 shows another design of an intermediate ring 11a. This also has two projections 14a, 15a, the second projection 14a being in the form of a continuous radial annular projection with convex indents 19 for contacting the respective flat steps 8 of the planetary bolts 2, and recesses 20 for assembly. Thanks to the recesses 20 the intermediate ring 11a can be passed through the planetary bolts 2 and the two projections 14a and their indents 19 and the projection 15 on the planetary bolt 2 can be latched by rotating the collecting tray 10.

Figure 12:
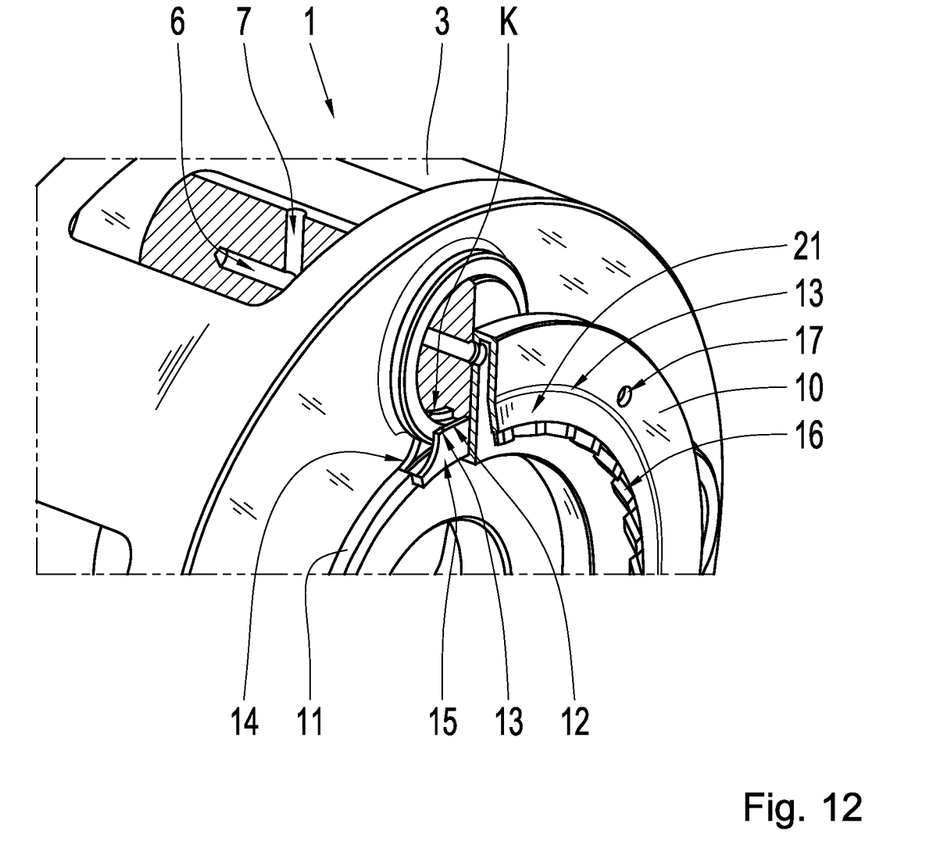
FIG. 12: An assembled lubricant device with the collecting tray shown sectioned.

FIG. 12 shows an assembled lubricant device 1 without planetary bolts 2, with blades 16. In this case the collecting tray 10 can have an axially prominent guide-plate 21 to improve the capture of oil.

The collecting tray 10 and the intermediate ring 11, as well as the projections 14, 15, can be made integrally of one material, for example plastic. Alternatively, the two projections 14a, 14, 15 can be made of metal, for example steel, and fixed onto the intermediate ring 11, 11a. This is advantageous for the securing of the planetary bolts 2.

INDEXES

1 Lubricant device
2 Planetary bolts
3 Planetary carrier
4 Opening in the planetary carrier
5 Axially projecting end area
6 Blind-hole bore
7 Ducts
8 Flat step
9 Groove
10 Collecting tray
11, 11a Intermediate ring
12 Flat contact surface of the first projection
13 Bevel
14, 14a Second projection
15 First projection
16 Blades
17 Overflow bore
18 Arrow
19 Convex indents
20 Recesses
21 Axially prominent guide plate
22 Chamfer
K Curvature

The invention claimed is:

1. A lubricant device configured for supplying lubricant to a planetary carrier of a planetary gearset having a planetary carrier defining an opening the lubricant device comprising:
 at least one planetary bolt which passes through and extends beyond the openingin the planetary carrier so that at a front end of the at least one planetary bolt has an axially projecting end area;
 a collecting tray configured for guiding lubricant which, in an operating condition, flows along the collecting tray to the at least one planetary bolt; and
 an annular intermediate element which, in an assembled condition, is fixed axially onto the collecting tray facing in a direction of the planetary carrier, wherein the annular intermediate element has a first radial projection and a separate second radial projection a distance away in the axial direction,
 and wherein the planetary bolt has at its axially projecting end area a corresponding first fixing contour and a second fixing contour a distance away in the axial direction, in order to latch the first radial projection of the annular intermediate element into the first fixing contour to produce an arrangement secure against rotation and in order to latch the second radial projection into the second fixing contour to produce an axially secure arrangement of the collecting tray and the planetary bolt.

2. The lubricant device according to claim 1, wherein the first fixing contour is in the form of a flat step at an extreme axial end of the axial end area of the planetary bolt, and wherein the first radial projection has a flat contact surface corresponding thereto.

3. The lubricant device according to claim 2, wherein the first radial projection is trapezium-shaped or rectangular, with the corresponding flat contact surface.

4. The lubricant device according to claim 2, wherein the flat contact surface is beveled by a chamfer, so that assembly is carried out by rotating the collecting tray to enable the simple latching of the flat contact surface in the first fixing contour in the form of a flat step.

5. The lubricant device according to claim 1, wherein the second fixing contour is in the form of a groove.

6. The lubricant device according to claim 5, wherein radially at its end the second projection is uniformly convex, with a curvature, such that the curvature corresponds essentially to an existing planetary bolt curvature of the planetary bolt.

7. The lubricant device according to claim 6, wherein the second radial projection is beveled by a chamfer, so that assembly is carried out by rotating the collecting tray to enable the simple latching of the convexly shaped second projection into the second fixing contour in the form of a groove.

8. The lubricant device according to claim 1, wherein the first radial projection and the second radial projection are arranged axially apart one behind the other.

9. The lubricant device according to claim 1, comprising a plurality of planetary bolts arranged in a circle, wherein each planetary bolt of the plurality of planetary bolts analogously has at its axially projecting end area a corresponding first fixing contour and a second fixing contour axially a distance away, wherein the intermediate element has, respectively arranged correspondingly thereto, a first radial projection and a separate, second radial projection a distance away in the axial direction, to enable latching in each case of the first radial projection of the annular intermediate element into the respective first fixing contour to form a rotationally secure arrangement and to enable latching in each case of the second radial projection into the respective second fixing contour to form an axially secure arrangement of the collecting tray and the planetary bolts.

10. The lubricant device according to claim 1, wherein the collecting tray defines at least one overflow opening to limit the amounts of lubricant in the collecting tray.

11. The lubricant device according to claim 10, wherein the planetary bolt defines a blind-hole bore for receiving the lubricant and the at least one overflow opening is arranged radially under the blind-hole bore in the collecting tray.

12. The lubricant device according to claim 1, wherein the collecting tray is in the form of a flat circle, and blades are arranged radially inside on the collecting tray for producing a suction force that acts upon the lubricant.

13. The lubricant device according to claim 12, wherein the blades are arranged equidistantly all around the collecting tray.

14. The lubricant device according to claim 1, wherein the first and second radial projections are made of metal and are fixed on the intermediate element.

15. A method for assembling a lubricant device for supplying lubricant to a planetary carrier of the planetary gearset, the said method comprising the following steps:
 preparing at least one planetary bolt, which is passed through and extends beyond an opening of the planetary carrier so that at the front an axially projecting end area is formed, and wherein the planetary bolt, at its axially projecting end area, has a first fixing contour and a second fixing contour a distance away in the axial direction;
 preparing an annular collecting tray for guiding lubricant that during operation flows along the collecting tray to the planetary bolt, wherein the collecting tray has an annular intermediate element which is arranged on the collecting tray facing axially toward the planetary carrier, wherein the intermediate element has a first radial projection and a separate, second radial projection a distance away in the axial direction;

arranging the collecting tray in such manner that the first projection and the second projection are an angular distance away from the first fixing contour and the second fixing contour, respectively; and rotating the collecting tray so as to latch the first radial projection of the annular intermediate element into the first fixing contour to form a rotationally secure arrangement, and so as to latch the second radial projection into the second fixing contour to form an axially secure arrangement of the collecting tray and the planetary bolts.

* * * * *

UNITED STATES PATENT AND TRADEMARK OFFICE
CERTIFICATE OF CORRECTION

PATENT NO. : 12,264,736 B2
APPLICATION NO. : 18/659727
DATED : April 1, 2025
INVENTOR(S) : Alfred Junk Page 1 of 1

It is certified that error appears in the above-identified patent and that said Letters Patent is hereby corrected as shown below:

In the Claims

In Claim 1, Column 9, Line 38, "openingin" should read -- opening in --.

Signed and Sealed this
Seventeenth Day of June, 2025

Coke Morgan Stewart
*Acting Director of the United States Patent and Trademark Office*